United States Patent [19]

Mayfield

[11] Patent Number: 5,737,565
[45] Date of Patent: Apr. 7, 1998

[54] SYSTEM AND METHOD FOR DIALLOCATING STREAM FROM A STREAM BUFFER

[75] Inventor: Michael John Mayfield, Austin, Tex.

[73] Assignee: International Business Machines Corporation, Armonk, N.Y.

[21] Appl. No.: 519,032

[22] Filed: Aug. 24, 1995

[51] Int. Cl.$^6$ .................................................. G06F 12/02
[52] U.S. Cl. ................................. 395/421.03; 395/460
[58] Field of Search ......................... 395/464, 421.03, 395/460, 449, 445, 463

[56] References Cited

U.S. PATENT DOCUMENTS

| | | | |
|---|---|---|---|
| 4,442,488 | 4/1984 | Hall | 395/452 |
| 4,980,823 | 12/1990 | Liu | 395/463 |
| 5,146,578 | 9/1992 | Zangenehpour | 395/464 |
| 5,317,718 | 5/1994 | Jouppi | 395/464 |
| 5,345,560 | 9/1994 | Miura et al. | 395/250 |
| 5,353,419 | 10/1994 | Touch et al. | 395/582 |
| 5,361,391 | 11/1994 | Westberg | 395/464 |
| 5,371,870 | 12/1994 | Goodwin et al. | 395/872 |
| 5,388,247 | 2/1995 | Goodwin et al. | 395/470 |
| 5,473,764 | 12/1995 | Chi | 395/383 |
| 5,490,113 | 2/1996 | Tatosian et al. | 365/189.05 |
| 5,566,324 | 10/1996 | Kass | 395/487 |
| 5,586,294 | 12/1996 | Goodwin et al. | 395/464 |
| 5,586,295 | 12/1996 | Tran | 395/464 |

FOREIGN PATENT DOCUMENTS

WO 92/20027  11/1992  WIPO.

OTHER PUBLICATIONS

MC88110 Second Generation RISC Microprocesser User+s Manual, 1991.

Dahlgren and Stenstrom, "Effectiveness of Hardware–Based Stride and Sequential Prefetcthing in Shared–Memory Multiprocessors", High Performance Computer Architecture, 1995 Symposium, pp. 68–77, Feb. 1995.

Chen and Baer, "Effective Hardware–Based Data Prefetching for High–Performance Processors", IEEE Transactions on Computers, V.44, No. 5, pp. 609–623, May 1995.

Chiueh, Tzi–cker, "Sunder: A Programmable Hardware Prefetch Architecture for Numerical Loops", Supercomputing '94, pp. 488–497.

Farkas, Jouppi, and Chow, "How Useful Are Non–blocking Loads, Stream Buffers and Speculative Execution in Multiple Issue Processors", High Performance Computer Architecture, 1995 Symposium, pp. 78–89, Feb. 1995.

Palacharla and Kessler, "Evaluating Stream Buffers as a Secondary Cache Replacement", Computer Architecture, 1994 International Symposium, pp. 24–33.

Evaluating Stream Buffers as a Secondary Cache Replacement, S.Palacharla and R. Kessler, 1994 IEEE 1063–6879/94.

U.S. application No. 08/442,740.

*Primary Examiner*—Tod R. Swann
*Assistant Examiner*—Christopher S. Chow
*Attorney, Agent, or Firm*—Kelly K. Kordzik; Winstead Sechrest & Minick P.C.; Anthony V.S. England

[57] ABSTRACT

A system and method to use stream filters to defer deallocation of a stream based on the activity level of the stream, thereby preventing a stream thrashing situation from occurring. The least recently used ("LRU") stream is deallocated only after a number of potential new streams are detected. In a data processing system, a method for prefetching cache lines from a main memory to an L1 cache coupled to a processor coupled by a bus to the main memory, wherein the prefetching is augmented with the utilization of a stream buffer and a stream filter, wherein the stream buffer includes an address buffer and a data buffer, wherein the stream buffer hold one or more active streams, and wherein the stream filter contains one or more entries corresponding to one or more active streams, the method comprising the steps of monitoring a sequence of L1 cache misses; replacing entries in the stream filter in response to the L1 cache misses on an LRU basis; and maintaining one of the one or more active streams in the stream buffer until all of the one or more entries corresponding to the one of the one or more active streams have been replaced by the replacing step.

24 Claims, 11 Drawing Sheets

FIG. 3
PRIOR ART
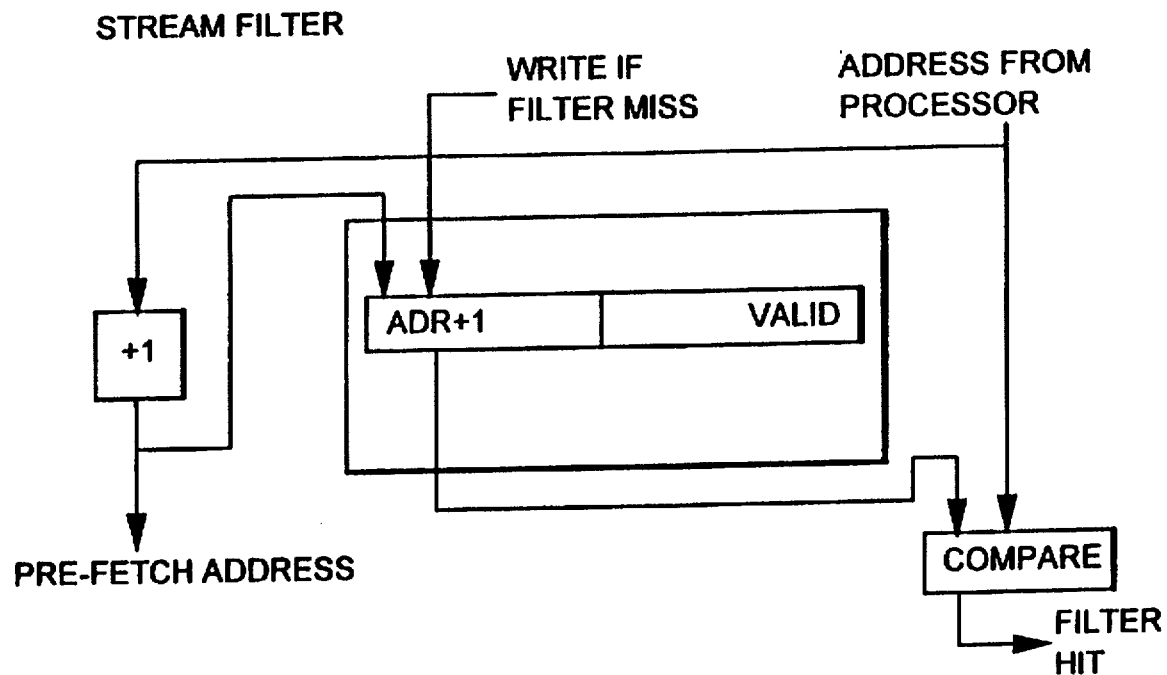
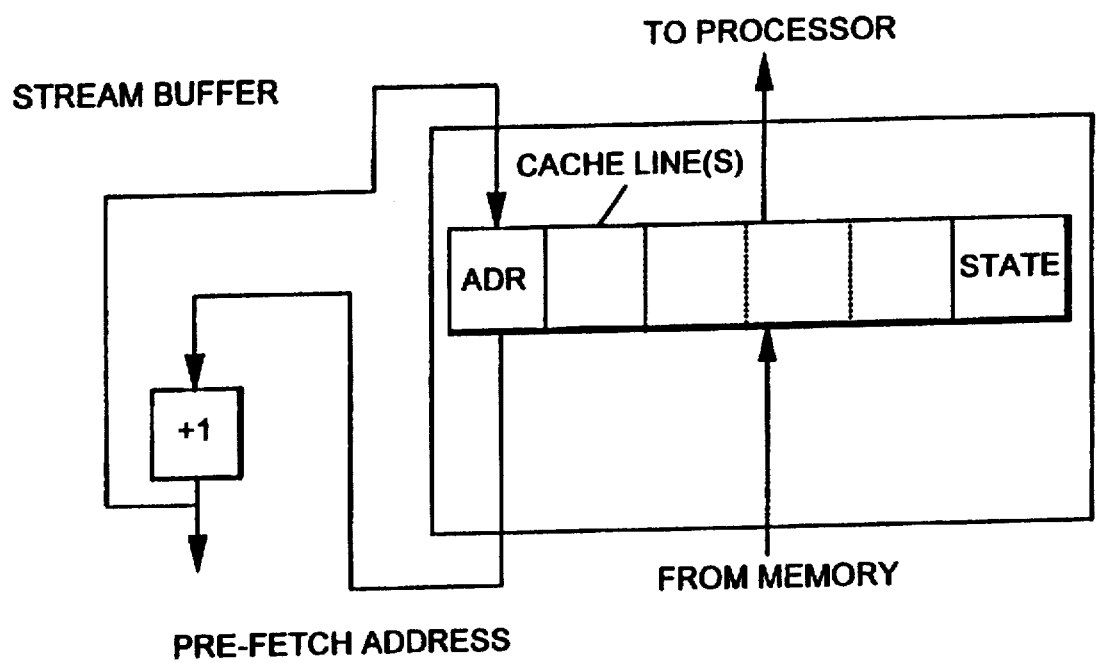

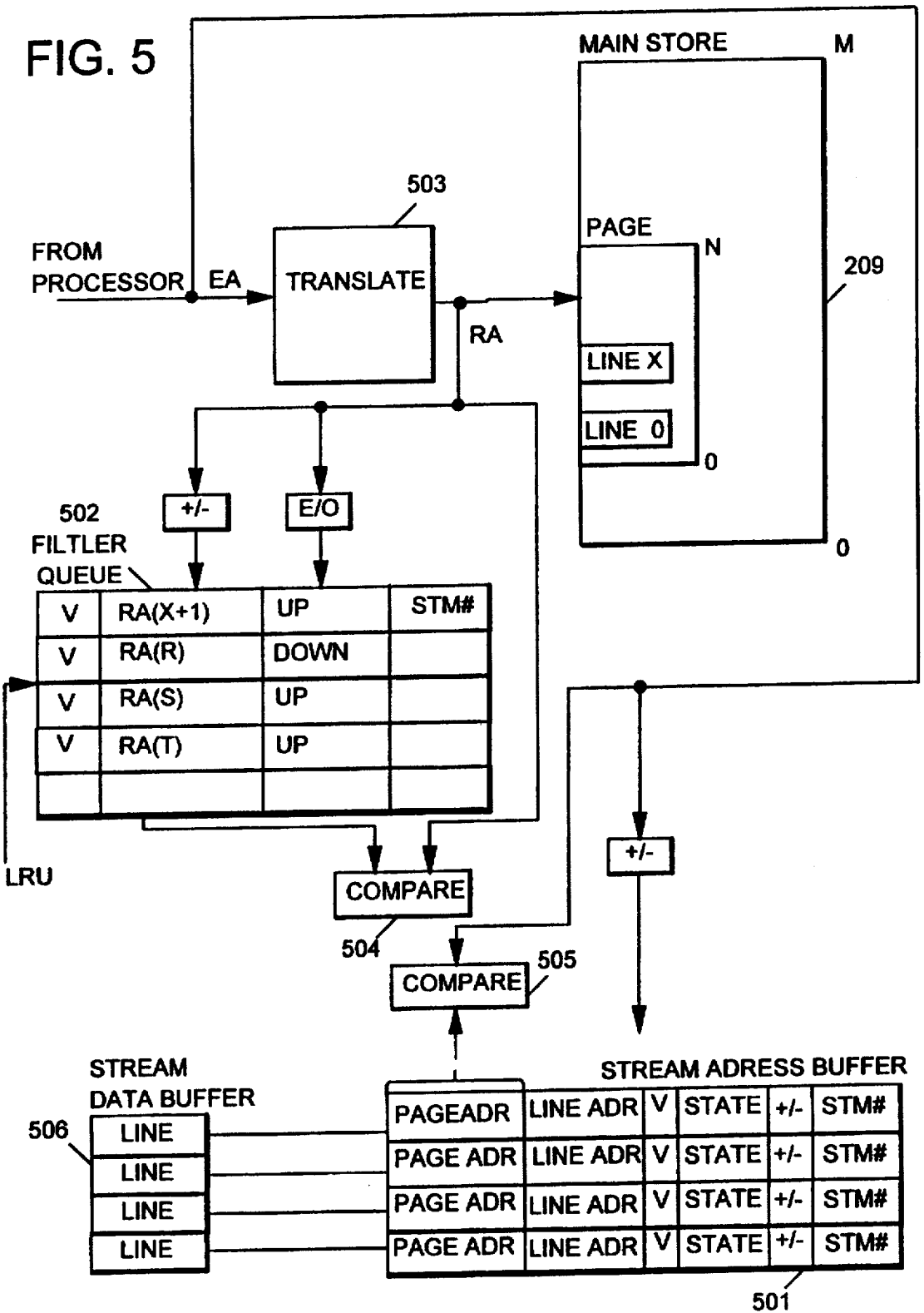

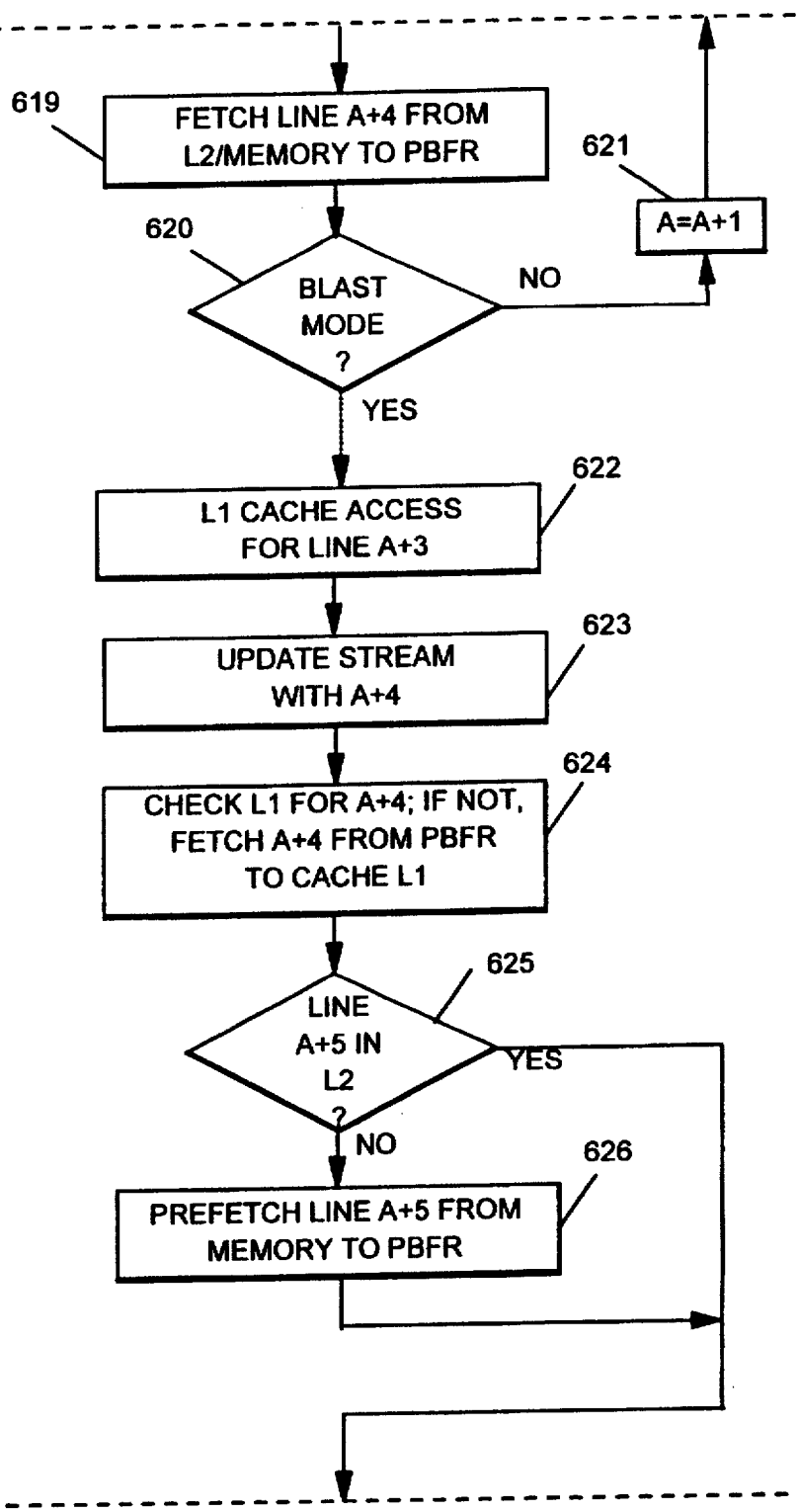

SYSTEM AND METHOD FOR DIALLOCATING STREAM FROM A STREAM BUFFER

CROSS-REFERENCE TO RELATED APPLICATIONS

This application for patent is related to the following applications for patent filed concurrently herewith:

PROGRESSIVE DATA CACHE, U.S. patent application Ser. No. 08/519,031; and

MODIFIED L1/L2CACHE INCLUSION FOR AGGRESSIVE PREFETCH, U.S. patent application Ser. No. 08/518,348;

CACHE DIRECTORY FIELD FOR INCLUSION, U.S. patent application Ser. No. 08/518,347.

These applications for patent are hereby incorporated by reference herein as if fully set forth herein.

TECHNICAL FIELD OF THE INVENTION

The present invention relates in general to data processing systems, and in particular, to a system and method for operating a stream filter in a data processing system.

BACKGROUND OF THE INVENTION

A special very high-speed memory is sometimes used to increase the speed of processing within a data processing system by making current programs and data available to a processor ("CPU") at a rapid rate. Such a high-speed memory is known as a cache and is sometimes employed in large computer systems to compensate for the speed differential between main memory access time and processor logic. Processor logic is usually faster than main memory access time with a result that processing speed is mostly limited by the speed of main memory. A technique used to compensate for the mismatch in operating speeds is to employ an extremely fast, small memory between the CPU and main memory whose access time is close to processor logic propagation delays. It is used to store segments of programs currently being executed in the CPU and temporary data frequently needed in the present calculations. By making programs (instructions) and data available at a rapid rate, it is possible to increase the performance rate of the processor.

Analysis of a large number of typical programs has shown that the references to memory at any given interval of time tend to be confined within a few localized areas in memory. This phenomenon is known as the property of "locality of reference." The reason for this property may be understood considering that a typical computer program flows in a straight-line fashion with program loops and subroutine calls encountered frequently. When a program loop is executed, the CPU repeatedly refers to the set of instructions in memory that constitute the loop. Every time a given subroutine is called, it's set of instructions are fetched from memory. Thus, loops and subroutines tend to localize the reference to memory for fetching instructions. To a lesser degree, memory references to data also tend to be localized. Table look-up procedures repeatedly refer to that portion in memory where the table is stored. Iterative procedures refer to common memory locations and array of numbers are confined within a local portion of memory. The result of all these observations is the locality of reference property, which states that, over a short interval of time, the addresses of instructions generated by a typical program refer to a few localized areas of memory repeatedly while the remainder of memory is accessed relatively infrequently.

If the active portions of the program and data are placed in a fast small memory, the average memory access time can be reduced, thus reducing the total execution time of the program. Such a fast small memory is referred to as a cache memory as noted above. The cache memory access time is less than the access time of main memory often by a factor of five to ten. The cache is the fastest component in the memory hierarchy and approaches the speed of CPU components.

The fundamental idea of cache organization is that by keeping the most frequently accessed instructions and data in the fast cache memory, the average memory access time will approach the access time of the cache. Although the cache is only a small fraction of the size of main memory, a large fraction of memory requests will be found in the fast cache memory because of the locality of reference property of programs.

The basic operation of the cache is as follows. When the CPU needs to access memory, the cache is examined. If the word is found in the cache, it is read from the fast memory. If the word addressed by the CPU is not found in the cache, the main memory is accessed to read the word. A block of words containing the one just accessed is then transferred from main memory to cache memory. In this manner, some data is transferred to cache so that future references to memory find the required words in the fast cache memory.

The average memory access time of the computer system can be improved considerably by use of a cache. The performance of cache memory is frequently measured in terms of a quantity called "hit ratio." When the CPU refers to memory and finds the word in cache, it is said to produce a "hit." If the word is not found in cache, then it is in main memory and it counts as a "miss." If the hit ratio is high enough so that most of the time the CPU accesses the cache instead of main memory, the average access time is closer to the access time of the fast cache memory. For example, a computer with cache access time of 100 ns, a main memory access time of 1,000 ns, and a hit ratio of 0.9 produces an average access time of 200 ns. This is a considerable improvement over a similar computer without a cache memory, whose access time is 1,000 ns.

In modern microprocessors, the processor cycle time continues to improve with technology evolution. Also, design techniques of speculative execution, deeper pipelines, more execution elements and the like continue to improve the performance of the microprocessor. The improved performance puts a heavier burden on the memory interface since the processors demand more data and instructions from memory to feed the microprocessor. Large on-chip caches (L1 caches) are implemented to help reduce the memory latency, and they are often augmented by larger off-chip caches (L2 caches).

Prefetching techniques are often implemented to try to supply memory data to the L1 cache ahead of time to reduce latency. Ideally, a program would prefetch data and instructions far enough in advance that a copy of the memory data would always be in the L1 cache when the processor needed it.

The problem is that microprocessor architectures do not provide enough advance information to explicitly determine the data addresses that might be needed in all cases. As an example, the address for a data operand in memory is itself in memory and must be fetched by a first instruction to be used by the memory instruction. With such a sequence, the processor does not have the address in advance in order to perform a prefetch.

Prefetching of instructions and/or data is well-known in the art. However, existing prefetching techniques often prefetch instructions and/or data prematurely. The problem with prefetching and then not using the prefetched instructions and/or data is two-fold. First, the prefetch data may have displaced data needed by the processor. Second, the prefetch memory accesses may have caused subsequent processor cache reloads to wait for the prefetch accesses, thus increasing the latency of needed data. Both of those effects lower the efficiency of the CPU.

As disclosed in the above cross-referenced patent applications, stream buffers are utilized to assist in the prefetch of data from memory when the existence of sustained accesses to incremental memory locations is detected.

The problem is that with a finite number of stream buffers, where N streams can be active (allocated) at any instant in time, a "thrashing" condition can exist if there is a stream allocation of a new potential stream before the N allocated streams are exhausted, the new stream can displace one of the active streams before the prefetched data is used. Thus, there is a need in the art for a system and method for reducing thrashing of streams within stream buffers utilized in a prefetching protocol in a data processing system.

SUMMARY OF THE INVENTION

It is an object of the present invention to provide a system and method to use stream filters to defer deallocation of a stream based on the activity level of the stream, thereby preventing a stream thrashing situation from occurring. The least recently used ("LRU") stream is deallocated only after a number of potential new streams are detected.

An embodiment of the disclosed idea is to implement a stream buffer than can allocate up to 4 streams at any time. The filter buffer associated with the embodiment has 10 entries which are allocated on a least recently used basis.

In normal operation, when a stream access is detected by the filter, the filter entry for the stream is set to the most recently used position of the filter. Each time a new line is accessed in the associated Stream, the entry returns to the most recently used position. As an example, if there were 4 streams active (1,2,3,4), and if there were no other cache misses, the 4 streams would always occupy one of the 4 most recently used positions of the filter buffer. If there were cache misses between subsequent stream accesses, the filter would contain entries for those as well, so the 4 streams would occupy other than the 4 most recently used positions from time to time. With a filter of 10 entries, a stream could remain allocated as long as there were less than 9 instances of cache misses between any two consecutive stream accesses. Clearly, if there were 10 cache misses between stream accesses, the LRU policy would age out the stream allocation by allocating all 10 filter entries to the missed lines. If 4 streams were allocated, a stream would not age off the filter until there were 7 intervening cache misses (since the filter has enough entries for the 4 streams plus 6 other filter entries).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 illustrates a stream filter and a stream buffer;

FIG. 5 illustrates a functional diagram in accordance with the present invention;

FIGS. 6 and 6A–6D illustrates a flow diagram in accordance with an aggressive prefetching aspect of the present invention;

DETAILED DESCRIPTION OF A PREFERRED EMBODIMENT OF THE INVENTION

Figure 1:
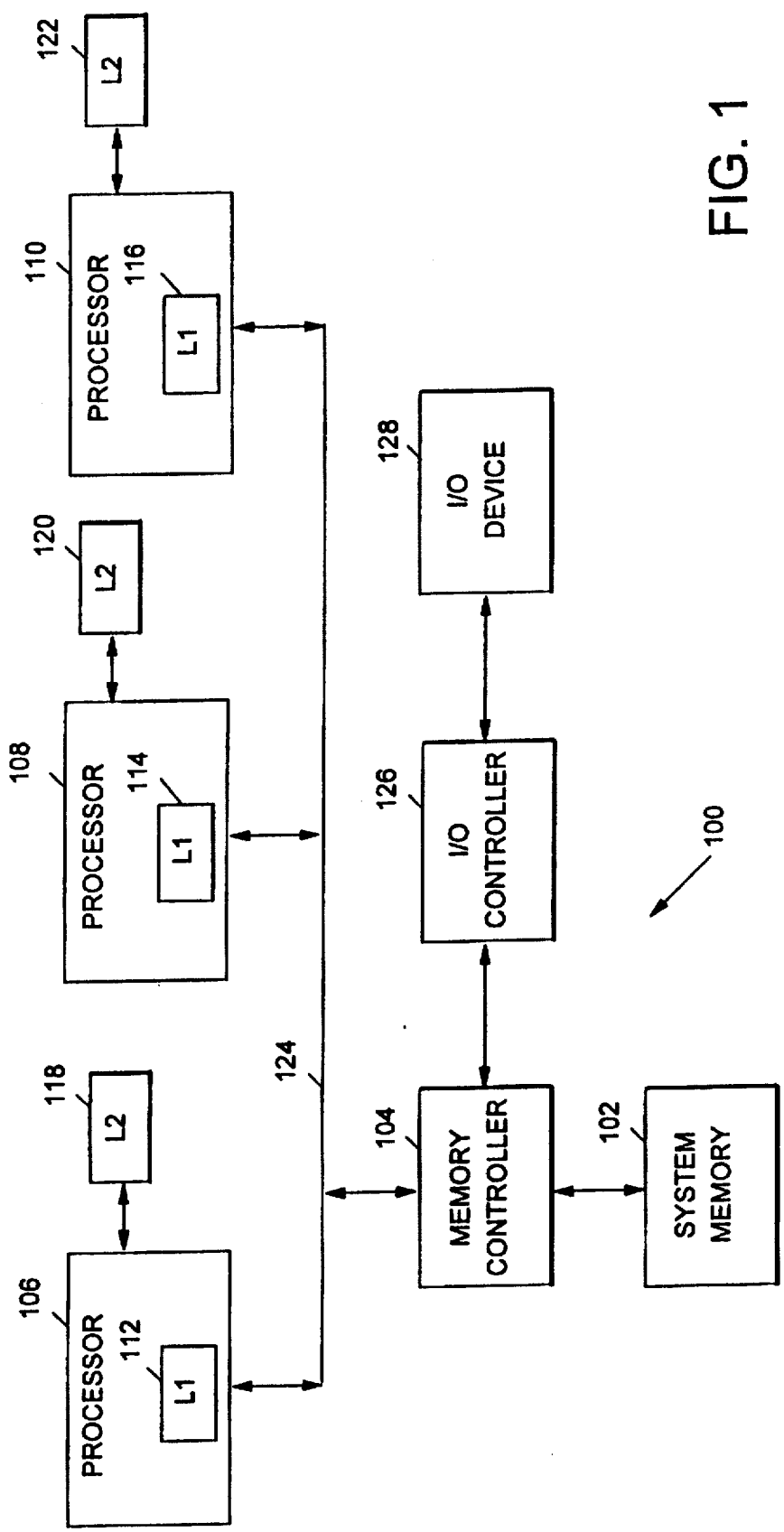
FIG. 1 illustrates a multiprocessor system configurable in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring now to FIG. 1, a data processing system which advantageously embodies the present invention will be described. Multiprocessor system 100 includes a number of processing units 106, 108, 110 operatively connected to system bus 124. Note that any number of processing units may be utilized within system 100. Also connected to system bus 124 is memory controller 104, which controls access to system memory 102. Memory controller 104 is also coupled to I/O controller 126, which is coupled to I/O device 128. Processing units 106, 108, 110, I/O controller 126, and I/O device 128 may all be referred to as bus devices herein. As shown, each processor unit 106, 108, 110 may include a processor and L1 caches 112, 114, 116, respectively. The L1 caches may be located on the same chip as the respective processor. Coupled to processing units 106, 108, 110 are L2 caches 118, 120, 122, respectively. These L2 caches are connected to the system bus 124 via the processor to which it is attached.

Each L1 and L2 cache pair are normally serially related. The L1 caches may be implemented as store in or write-through, while the larger and slower L2 cache is implemented as a write-back cache. Both the L1 and L2 cache controllers are physically implemented as part of the processing unit, and are connected via busses internal to the processing unit. The L2 controller could be off chip, and the invention would still apply.

Figure 2:
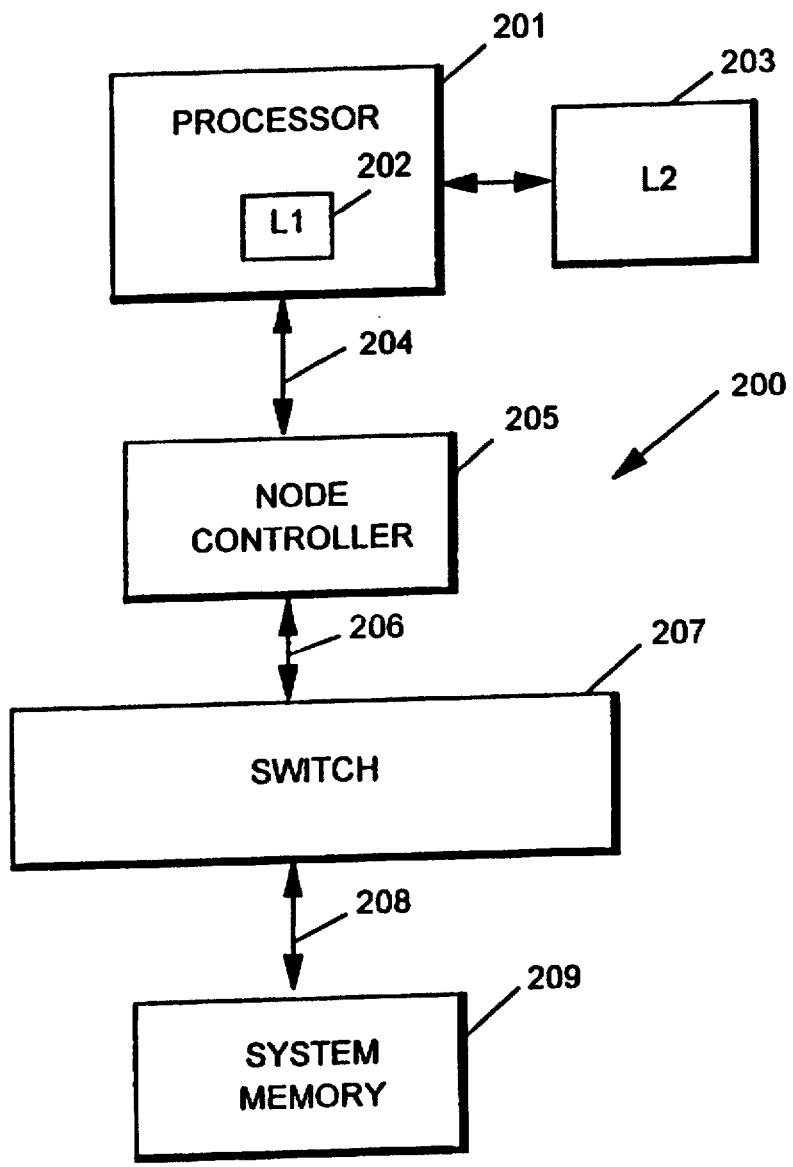
FIG. 2 illustrates a data processing system configurable in accordance with the present invention.

Referring next to FIG. 2, there is illustrated data processing system 200, which may also be configurable to operate in accordance with the present invention. System 200 is an alternative architecture to system 100. Within systems 100 and 200, the basic operation of the processors and caches is similar. The control and functions of memory controller 104 and node controller 205 are similar with respect to the present invention.

In system 200, processor 201 has internal L1 cache 202, which is coupled to external L2 cache 203. Processor 201 is coupled by bus 204 to node controller 205. Node controller 205 performs a basic function known in the art with respect to the coupling of processor 201 to the remainder of system 200. Node controller 205 is coupled by bus 206 to switch 207, which may be a cross-point switch, which is capable of coupling other processors and/or I/O devices (not shown) to system memory 209 by bus 208. The remainder of the discussion will be with respect to system 200; however, the discussion with respect to the present invention to follow is also relevant and may be embodied within system 100.

A goal of the present invention is to provide for an efficient and accurate technique for prefetching cache lines into L1 cache 202 so that processor 201 hits on these cache lines in L1 cache 202 a significant amount of time, thus minimizing retrievals of address and data information from system memory 209, which degrades the performance of processor 201.

One prior art technique that has been established to improve the performance of processor operations has been to utilize stream filters and buffers for prefetching of cache lines. Referring next to FIG. 3, stream filters and stream buffers are known in the art. Stream filters are meant to reduce the occurrence of prefetching data that is not used. These filters are history buffers that contain address and direction information. The filter contains the address of a cache line that is the next sequentially higher line from one that missed in the L1 cache. If an access is made to the next higher cache line, a stream condition is detected and a stream buffer is allocated. The filter would be written with line address "X+1" if there was an access to "X ."If a subsequent access is made to address "X+1" while "X+1" is still resident in the stream filter, "X+1" is then allocated as a stream.

Stream buffers are prefetch buffers that hold potential cache data. The idea is that if the program executing within the processor is executing a sequential stream of data/ instructions, prefetching additional lines into a stream buffer could be useful. Thus, a subsequent cache miss could find the data in the stream buffer.

The stream filter and stream buffers cooperate such that if there is a L1 cache miss that also misses the stream buffers, the miss address is compared against the addresses stored in the stream filter. If there is a hit in the stream filter (meaning that there was a sequential access to sequential lines of data) then there is a good possibility that the next line will also be needed in the future. For a further discussion of stream buffers and stream filters, please refer to *Evaluating Stream Buffers as a Secondary Cache Replacement*, by S. Palacharla and R. Kessler, 1994 IEEE 1063–6879/94, which is hereby incorporated by reference herein.

Figure 4:
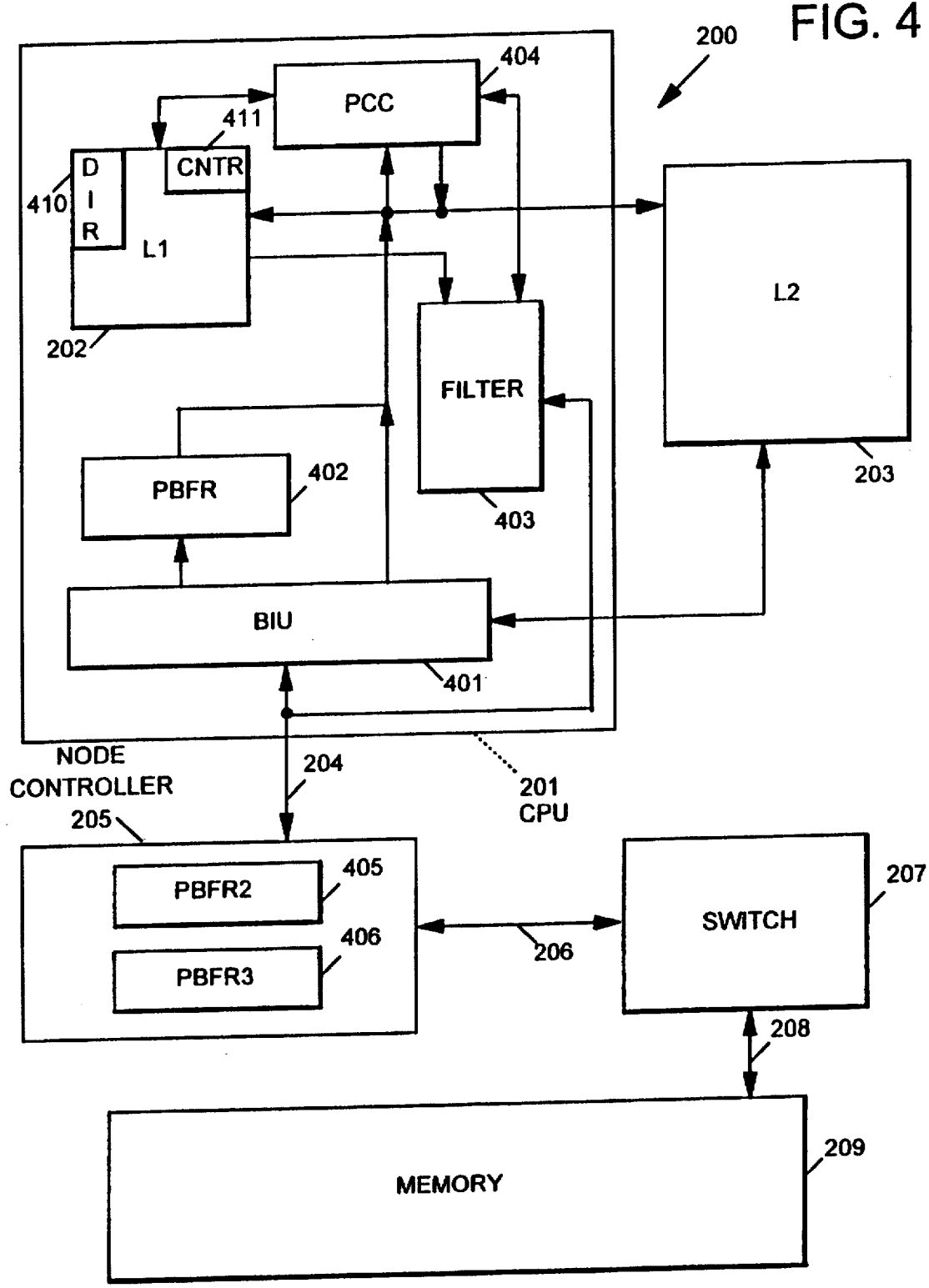
FIG. 4 illustrates a more detailed diagram of the system shown in FIG. 2.
Figure 6A:
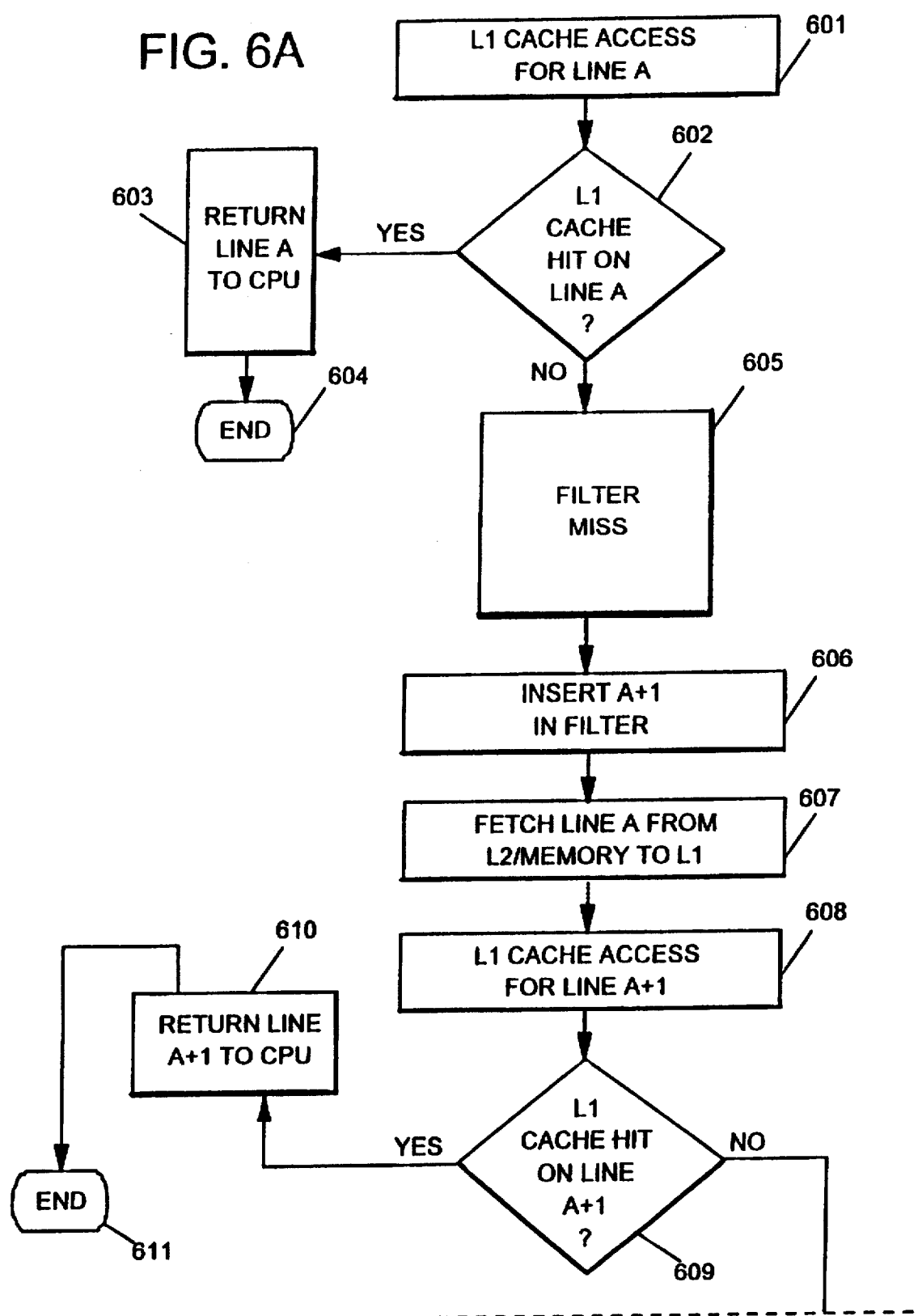
Figure 6B:
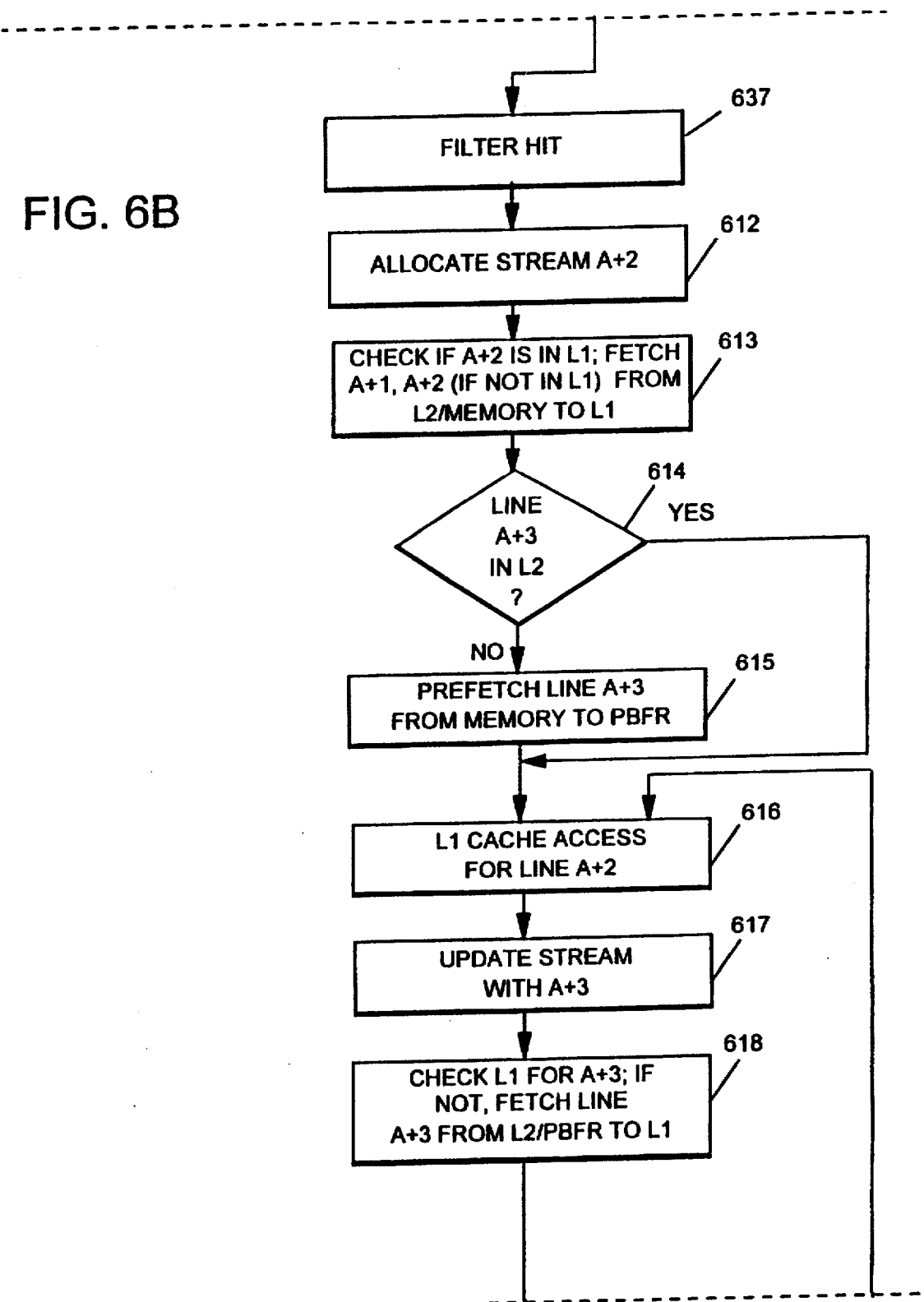
Figure 6D:
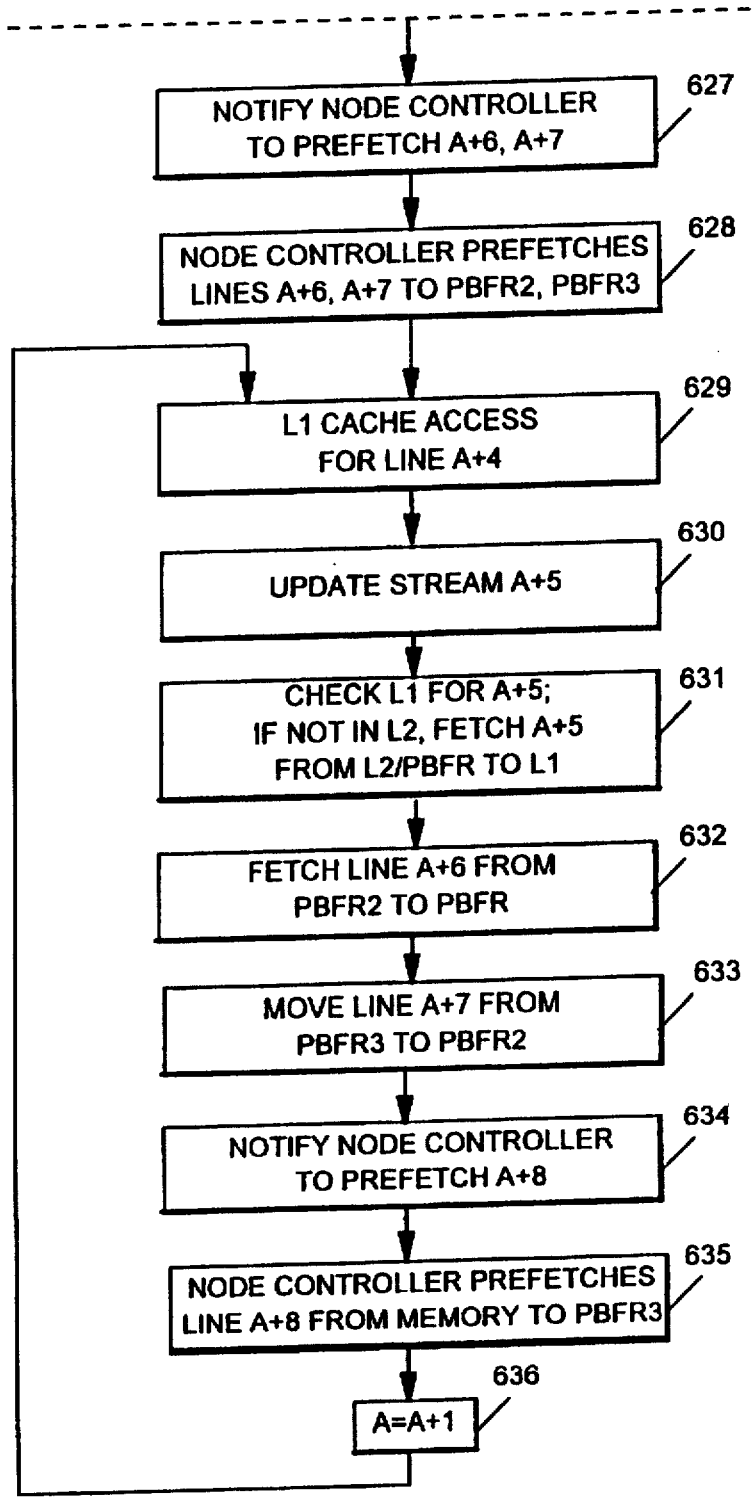

Referring next to FIG. 4, there is illustrated a more detailed diagram of system 200 configured in accordance with the present invention and illustrating a data flow throughout CPU 201. Variations of the flow are known in the art, including the use of separate L1 caches for instructions and data. L1 cache 202 holds frequently used copies of data from memory 209 using any replacement policy known in the art. The larger L2 cache 203 holds more data than L1 cache 202 and ordinarily controls the memory coherency protocol. In the present invention, the data in L1 cache 202 may be a subset of the data in L2 cache 203. L1 cache 202 and L2 cache 203 are "store-in" caches. Other functional elements (including I/O) vie for data using a snoop protocol known in the art. One form of snooping is disclosed within U.S. patent application Ser. No. 08/442,740, which is assigned to a common assignee and is hereby incorporated by reference herein.

The boundary shown for CPU 201 represents a chip boundary and a functional boundary, but is not meant as a restriction on the scope of the invention. PCC 404 is the processor cache controller and controls fetching and storing to the memory subsystem. PCC 404 has other functions that are known in the art, such as the implementation of a directory for L1 cache 202 and the translation of effective addresses to real addresses and vice versa. Prefetch buffer ("PBFR") 402 holds some number of lines of memory data to be staged to CPU 201 and L1 cache 202. PBFR 402 is a stream buffer.

When PCC 404 fetches data, if it is in L1 cache 202 (an L1 hit), it is sent to PCC 404. If it is not in L1 cache 202 (an L1 miss), but it is in L2 cache 203 (an L2 hit), a line of L1 cache 202 is replaced with this subject data from L2 cache 203. In this case, the data is sent simultaneously to L1 cache 202 and PCC 404. If there is a miss in L2 cache 203 as well, the data may be fetched from memory 209 into BIU 401 and loaded simultaneously into L1 cache 202, L2 cache 203, and PCC 404. Variations on this operation are known in the art. Data store operations are similar to the fetch operations except that the data is stored into an L1 line to complete the operation.

Within the following discussion, the various portions of the stream buffer are located in various portions of system 200. The system buffer, which is further discussed with respect to FIG. 5, includes a stream address buffer and a stream data buffer. In the present implementation, the stream buffer has the ability to store four cache lines, however, any number of cache lines could be implemented within the stream buffer. One cache line of the stream buffer is implemented in L1 cache 202. Essentially, one of the cache lines within L1 cache 202 is utilized for the function of one of the cache lines of the stream buffer. A second cache line of the stream buffer is located in PBFR 402. The other two cache lines of the stream buffer are located in PBFR2 405 and PBFR3 406 within node controller 205. Node controller 205 may be located on a chip downstream from CPU 201 along bus 204. Note, memory controller 104 may contain these stream buffer lines should the architecture of system 100 be utilized.

As discussed within the IEEE article referenced above, the basic operation of a stream filter and stream buffer is that when there is an L1 cache miss on a requested cache line, the address of that cache line is incremented (generally by one address) and this incremented address is inserted into stream filter 403. Upon the occurrence of a subsequent miss of a cache line within L1 cache 202, the address of this L1 cache miss is compared to the addresses contained within filter 403. If a match is observed of addresses, then a stream of cache lines is allocated within the stream buffer.

As noted above, a filter buffer is written with the address of the next sequential cache line when there is a cache miss.

The filter contains a number of locations that can hold such addresses comprising a "history" of such events. They may be replaced on a least recently used (LRU) basis. Whenever there is a cache miss, the addresses in a filter are compared with that of the cache line miss. If there is a hit, a filter hit is said to exist and a stream is allocated. In stream mode, an extra cache line(s) is prefetched into the stream buffer in expectation that it will be needed by the L1 cache as part of a stream.

FIG. 5 illustrates a high level functional diagram of the operation of the stream buffer in accordance with the present invention. CPU 201 generates an effective address (EA) according to the architecture used. The EA is the program address potentially with offsets. TRANSLATE circuit 503, which may be implemented in PCC 404, generates a translated address, or real address (RA) which corresponds to the EA. The real address is used by filter queue 502, but it would be within the scope of the present invention for filter queue 502 to use the effective address as an alternative. The RA is broadside compared with the RA's in filter queue 502; if the entry is valid, as indicated by its valid bit (V), a match is called a filter hit. Filter queue 502 also contains a guessed direction indicator for each entry which indicates that the guessed stream should be incremented or decremented (+/−1 or UP/DOWN). Each filter queue entry also contains a field, which indicates whether there is a stream that corresponds to that address, and if so, the stream number of the stram.

As is well-known, memory 209 is often logically divided into subsections, particularly, memory 209 is divided into pages, which are increments of memory assigned to a program by an operating system and may be used to control "paging" data between DASD (direct access storage device) and memory 209. Pages can be assigned non-sequentially relative to the sequential EA. Therefore, if the EA is used for prefetch of stream data, an address translation must be performed within translator (XLATE) 503 when crossing page boundaries, since the stream buffer contains real addresses, which as mentioned above may not be sequential. Each page is further divided into lines. A line size is determined by the cache implementation and corresponds to the amount of memory data in a cache line. A cache miss will result in a line of data being transferred to the cache.

When there is a filter hit, a stream can be allocated into stream address queue 501 and a corresponding allocation made into stream data buffer 506. The stream address entry contains the guessed effective address of the next line of data for a particular allocated stream. Once again, this is an implementation choice, and the real address could have been used as an alternative. The stream address entry also contains a valid (V) bit which indicates that the stream is allocated. There is also a State field that is used to keep track of the state of the stream. Also, a copy of the guessed direction is kept in the stream buffer. Comparator 505 compares processor EA's with the page and the line addresses contained in stream address queue 501. If there is a match, it is called a stream hit.

The functionality illustrated in FIG. 5 could be implemented in alternative ways and still be within the scope of the present invention.

Memory space within memory 209 may be divided into 128 byte lines. Each line may be divided in half so that the even half of a line is from address 0 to 63, and the odd half is from address 64 to address 127. As described above, CPU 201 generates a logical address (EA), which is translated to a real address to a cachable line in memory. Memory is divided into pages of 2*N bytes. The pages are divided into lines which correspond to a cache entry in size. Each time there is a cache miss, the associated real address is analyzed. If the real address is in the even half of a line, the potential stream is an incrementing one. The LRU filter queue entry within 502 is marked with the direction of "up" and the line miss RA is incremented by "1" and saved in the entry. If the RA is in the odd side of the line, the RA entry in queue 502 is decremented by one and "down" is marked within the entry.

It is within the scope of the present invention as an alternative implementation to save the RA in the filter entry on a miss and compare subsequent misses against the entry to determine the direction of up or down.

It can be seen that when a stream is assigned, the "next" effective line address is saved in stream address buffer 501. Buffer 501 contains an entry for each active stream. A valid "V" bit indicates that the entry is in use, and a direction indicator indicates if the stream is up or down (±). A State field is used to indicate the state of the stream. Associated with stream address buffer 501 is stream data buffer 506 which holds prefetched lines of data. Both filter queue 502 and stream buffer 501 predicted addresses are terminated when a page boundary is encountered. This is because such an event requires a new translation.

If there is an L1 cache 202 and L2 cache 203 cache miss, the stream buffer is interrogated before accessing memory 209. It is an obvious embodiment of the present invention to combine the circuits of filter queue 502 and stream address buffer 501.

The prior art with respect to stream filters and stream buffers as described above and within the IEEE article referenced above analyzes the effectiveness of a stream buffer as an L2 cache alternative. In this case, the prefetch is always guessed as incremental. In addition, a stride filter is discussed and shown where the address could be incremented by a "stride" other than one line or word and the stride length saved in the buffer. The stride filter concept could be implemented as an alternative embodiment and be within the scope of the present invention.

Referring next to FIGS. 6A–6D, there is illustrated a flow diagram of the progressive prefetch modes of the present invention. As discussed above, the present invention allows for three progressive prefetch modes: normal, Data Prefetch, and Blast. In normal mode, data is not prefetched. In Data Prefetch mode, two lines are prefetched, one line to the L1 cache and one line to a stream buffer. In Blast mode, more than two lines are prefetched at a time. In a preferred embodiment of the present invention, in Blast mode, four lines are prefetched, two lines as in Data Prefetch mode, and two additional lines to a stream buffer. In any mode, the prefetched buffers could be packaged on the processor chip, the cache chip, external chips or on the memory cards and still be within the scope of the present invention. FIGS. 6A–6D illustrate an example where the direction for guessing in which direction the stream will flow is incrementing. The decrementing example would be an obvious modification of this example. The flow diagram of FIGS. 6A–6D illustrate how the Data Prefetch and Blast modes are entered into.

In step 601, CPU 201 begins to access data starting at cache line A. In step 602, a determination is made whether or not cache line A is within L1 cache 202. If so, the process proceeds to step 603 wherein cache line A is returned to CPU 201 and the process then ends at step 604.

However, if there is a miss on cache line A, the process proceeds to step 605 wherein the address of cache line A is compared to all of the addresses contained within stream filter 403.

As cache line A is not present within filter 403, the process proceeds to step 606, wherein the address of cache line A is incremented by 1 and inserted within filter 403. Thereafter, in step 607, cache line A is fetched from either L2 cache 203 or memory 209 to L1 cache 202. This step is well-known within the art.

The dashed arrow from step 607 to step 608 within FIGS. 6A–6D illustrate that step 608 may or may not occur immediately subsequent to step 607. Generally, as many misses as there are address entries within the stream filter may occur previous to the request for cache line A+1.

At some time later, CPU 201 may request cache line A+1. Again, PCC 404 determines whether or not cache line A+1 is present within L1 cache 202 (step 609). If yes, cache line A+1 is returned to CPU 201 in step 610 and the process ends in step 611. Note that since the cache line A+1 is in L1 cache 202, there is no comparison against stream filter 403, and the A+1 entry remains in filter 403 until it is retired by a filter replacement algorithm, which may be performed in accordance with the teachings below. However, if there is a miss on cache line A+1 within L1 cache 202, there is a filter hit (step 637), causing the process to proceed to step 612 wherein a stream of cache lines beginning with cache line A+2 is allocated since the address of requested cache line A+1 will be matched with the address A+1 resident within filter 403 resulting in a hit in filter 403. Next, in step 613, cache line A+1 is fetched from either L2 cache 203 or memory 209 to L1 cache 202. Also, L1 cache 202 is checked to determine if cache line A+2 is present. If not present, cache line A+2 is fetched either from L2 cache 203 or memory 209.

Thereafter, in step 614, a determination is made whether or not cache line A+3 resides within L2 cache 203. If not, the process proceeds to step 615, wherein cache line A+3 is prefetched from memory 209 and inserted within prefetch buffer 402. However, if cache line A+3 is resident within cache 203, the process skips step 615.

Again, the dashed arrow line from step 615 to step 616 represents that step 616 may not occur immediately subsequent to step 615.

In step 616, processor 201 may request cache line A+2 resulting in an access for line A+2 to L1 cache 202. Since in step 613, cache line A+2 was fetched into L1 cache 202, L1 cache 202 will be able to supply this cache line to CPU 201. In step 617, the stream addresses within stream address buffer 501 are updated to have address A+3 at the head of the stream. Thereafter, in step 618, L1 cache 202 is checked to determine if cache line A+3 is present; if not, cache line A+3 is fetched from either L2 cache 203 or buffer 402 to L1 cache 202. Next, in step 619, cache line A+4 will be fetched from either L2 cache 203 or memory 209 into prefetch buffer 402.

Thereafter, if Blast mode is not enabled in system 200 (step 620), the process essentially returns to step 616 and loops through steps 616 through 621 as long as CPU 201 continues to increment through the cache lines in the incrementing sequential manner as shown. Step 621 represents that in step 616, there might be an L1 cache access for line A+3, and then in step 617, the stream is updated with address A+3, and in step 618, line A+4 is fetched to L1 cache 202, and in step 619, cache line A+4 is fetched to buffer 402.

The foregoing describes the Data Prefetch mode. If in step 620, Blast mode is enabled in system 200, the process may proceed to step 622 when there is a request from CPU 201 for cache line A+3. In step 622, for such a request, PCC 404 will look within L1 cache 202 for cache line A+3. Since cache line A+3 is resident within L1 cache 202 because of step 618, cache line A+3 will be returned to CPU 201. Thereafter in step 623, the stream addresses within stream address buffer 501 will be updated to A+4. In step 624, L1 cache 202 is checked to determine if line A+4 is present; if not, cache line A+4 will be fetched from buffer 402 to the prefetch buffer position implemented within L1 cache 202.

Thereafter, in step 625, a determination is made whether or not cache line A+5 is resident within L2 cache 203. If so, the process could proceed to either step 626 or step 627. The implementation could require that node controller 205 be notified of every stream buffer access. Limiting the notifications to ones where the next stream buffer line is not in L2 cache 203 and therefore needs to be fetched will cause node controller buffers 405 and 406 to be temporarily out of synchronization with processor 201. The benefit of this design trade-off is that step 626 and 627 can be combined, reducing address bus traffic to node controller 205. Note that in the primary case being covered, none of the A, A+1, etc. lines existed in cache 202 prior to prefetching, so cache line A+5 is not expected to be in L2 cache 203 normally.

When steps 626 and 627 are combined for the reason described above, the notification of step 627 could be implemented with four additional control bits added to the prefetch of step 626. The four bits could be a 1-bit valid prefetch, a 2-bit stream identification, and a 1-bit prefetch direction. Using the address for cache line A+5 and these bits, node controller 205 can generate memory requests for cache lines A+6 and A+7. As stated before, node controller 205 can be implemented to prefetch any number of cache lines. In step 628, node controller 205 will prefetch line A+6 into prefetch buffer PBFR2 405 and will prefetch cache line A+7 into buffer 406 (PBFR3).

The dashed line between steps 628 and 629 indicates the request from CPU 201 for cache line A+4 may not occur immediately subsequent to step 628.

In step 629, L1 cache 202 is accessed for cache line A+4 requested by CPU 201. Since cache line A+4 was inserted into L1 cache 202 in step 624, cache line A+4 will be returned to CPU 201. In step 630, the stream address is incremented to now be headed by address A+5. In step 631, L1 cache 202 is checked to determine if cache line A+5 is present; if not, cache line A+5 is fetched from either L2 cache 203 or buffer 402 into L1 cache 202.

Thereafter, in step 632, cache line A+6 is moved from buffer 405 to buffer 402. In step 633, cache line A+7 is moved from buffer 406 to buffer 405. Thereafter, in step 634, node controller 205 is notified to prefetch cache line A+8. In this implementation, the fetch of cache line A+6 is step 632 is the notification to node controller 205 to prefetch cache line A+8 (step 634). In step 635, node controller 205 prefetches cache line A+8 from memory 209 into buffer 406.

Thereafter, as long as CPU 201 continues accessing cache lines in an incremental sequential manner (i.e., CPU 201 continues accessing cache lines within the allocated stream) the process will continue looping through steps 629–636 in an incremental manner (step 636).

Within the foregoing discussion, bus interface unit (BIU) 401 may perform the fetching of cache lines from memory 209.

Node controller 205 may be a port on switch 207.

Because effective addresses are continuous across page boundaries and real addresses are not, it is often advantageous to utilize effective addresses when comparing two addresses within the stream address buffer 501. In addition, because of the foregoing, a counter may be used to produce incremental addresses.

As noted above, control bits may be utilized within a fetch from BIU 401 to memory 209 to notify node controller 205 that it is to prefetch cache lines into buffers 405 and 406. One bit may inform node controller 205 that this particular line request requires that node controller 205 perform a prefetch into its buffers. Another two bits may inform node controller 205 of which stream numbers are associated with the prefetch. Another bit may indicate which direction in a cache line the addresses are heading. Node controller 205 when notified to perform a prefetch may perform such a prefetch independently of the operation of CPU 201.

An advantage in having one of the stream buffer lines within L1 cache 202 is that when that particular cache line included within that buffer line in L1 cache 202 is requested by processor 201, a hit occurs within L1 cache 202 and not a miss. Technically, a miss would occur even though a requested cache line is included within a separate buffer attached to the L1 cache 202. Because of such a miss, extra hardware and cycle time would be required to retrieve that cache line from that stream buffer line into CPU 201. It could be said that the cache line within L1 cache 202 acting as one of the stream buffer cache lines is included within the prefetch stream buffer in logical terms.

When maintaining inclusion with respect to L1 cache 202 and L2 cache 203, when a cache line is moved up into L1 cache 202 from buffer 402 within the foregoing procedure, the same cache line will also be included within L2 cache 203.

In traditional implementations, the L2 cache contains a superset of the data in the L1 cache. This "inclusion" algorithm provides a means to assure coherency within a data processing system. Essentially, inclusion means that every cache line that is in the L1 cache also exists in the L2 cache. The L1 cache, as an example, could perform a write-back such that any modification of data in the L1 cache would be mirrored in the L2 cache. When a cache line was cast out of the L1 cache, it could be discarded since the data also existed in the L2 cache.

L2 cache 203 may be direct-mapped, which means that every line in memory can exist in only one location in L2 cache 203. Conversely, an associative cache has several locations where a particular cache line may simultaneously exist. As an example, assume that L2 cache 203 is direct-mapped and has a capacity of 16 cache lines. As an example, for such a structure, all cache lines that have an address that ends in 0 (i.e., concatenated with 0) would end up in the 0 slot in L2 cache 203. All cache lines that end in 1 would end up in the 1 slot, and all the cache lines that end in 15 would end up in the 15 slot.

Conversely, L1 cache 202 is set associative. Therefore, cache lines can appear in multiple places in L1 cache. As a result, for example, L1 cache 202 could have an XYZ line that ended in 15 and an ABC line that ended in 15 at the same time. Such an example could occur if "inclusion" is not maintained between L1 cache 202 and L2 cache 203. However, if system 200 is maintaining "inclusion" between the caches, then if CPU 201 wishes to load the XYZ line, but it also contains the ABC line, then L2 cache 203 will force CPU 201 to throw away the ABC line before it will load the XYZ line because it only has one place to put it, even though L1 cache 202 has multiple places to load it. This can cause problems when prefetching. For example, assume that in accordance with the algorithm shown with respect to FIGS. 6A–6D that cache line XYZ 15 is within buffer 402 and CPU 201 gets a hit on XYZ 14 residing within L1 cache 202. According to the flow diagram, XYZ 15 in buffer 402 will be prefetched into L1 cache 202. If inclusion is maintained, then XYZ 15 will also be loaded into L2 cache 203. If L2 cache 203 also contains ABC 15, then the afore-mentioned prefetch operation will cause a cache line within L1 cache 202 to be thrashed or kicked out.

Not only is a line within L1 cache 202 caused to be thrown out because of the prefetching of XYZ 15 into L1 cache 202, but ABC 15 in L2 cache 203 will also be kicked out because of the inclusion of XYZ 15 (remember that L2 cache 203 is direct-mapped), and there is a possibility that a cache line in L1 cache 202 also contains cache line ABC 15. If ABC 15 is thrown out of L2 cache 203 because of the inclusion of XYZ 15, then cache line ABC 15 will also have to be thrown out of L1 cache 202.

The foregoing scenario is a problem when CPU 201 is making use of random data, such as in an application program that uses both random data and stream data. This random data will be located within L2 cache 203. However, with the foregoing scenario, and with data inclusion, when XYZ 15 is prefetched into L1 cache 202, it will also be included into a cache line in L2 cache 203, which will displace data already existing in that location within L2 cache 203. If this data was part of the random data being processed by CPU 201, then the next time that CPU 201 requires the use of that particular piece of data, it will have to request it from memory 209, which as discussed above results in a considerable memory latency problem.

In certain other operations, strings of data might be read into CPU 201 with no intention of modifying them. An example would be a database application search where the string is being read for the occurrence of specific records. When such a record is encountered, it may or may not be written to. In these cases, the data being read is not needed in L2 cache 203 and, in fact, writing the data into L2 cache 203 could cause additional bus congestion due to cast outs. Performance would be impacted by the string displacing needed data in L2 cache 203 with transient read-only data.

In Blast mode, prefetch data is written to L1 cache 202 and not L2 cache 203 (no "inclusion," i.e., "exclusion"), as described above with respect to FIGS. 6A–6D. This creates lines in L1 cache 202 that are not included in L2 cache 203. In directory based systems, when unmodified lines are discarded (deallocated) by cache controller 411, the deallocation must be signalled to the directory for the system memory, which keeps track of which processors have which lines. Consequently, when L1 cache controller 411 deallocated an unmodified line which is not contained in L2 cache 203, this event must be signalled to the memory directory. In the implementation described, the signalling of this event is via a "reset inclusion" command sent from CPU 201 to the memory 209 directory.

Figure 7:
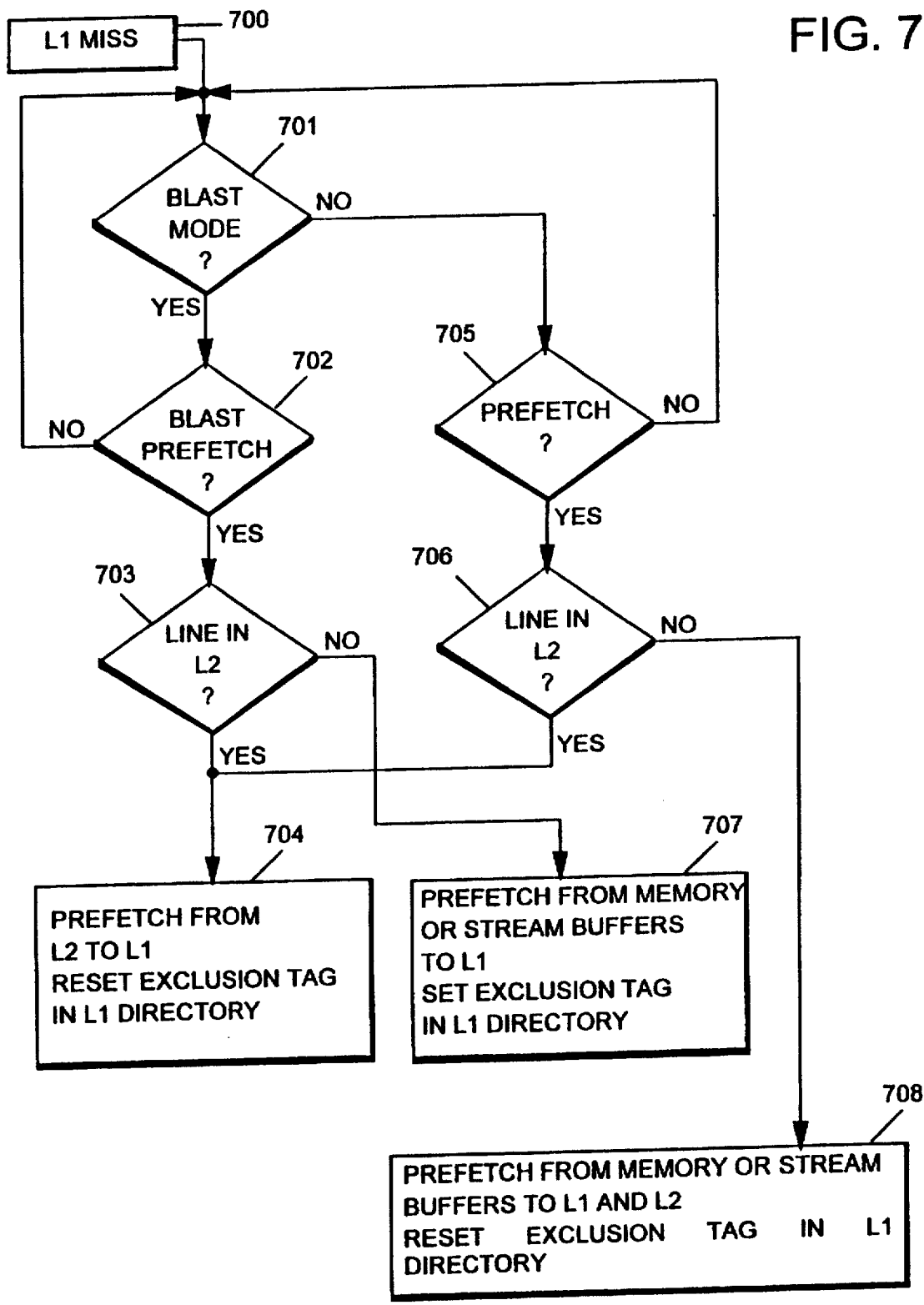
FIG. 7 illustrates a flow diagram of prefetching of a cache line to the L1 cache and not to the L2 cache and the setting of a tag bit in a directory field associated with the prefetched cache line.

Referring next to FIG. 7, there is illustrated a flow diagram of when a new cache line is loaded into L1 cache 202 and not in L2 cache 203 (exclusion). The process beings with step 700 where a miss has occurred with respect to a requested cache line from L1 cache 202. This miss could be a normal demand miss, or a prefetch request as described in FIGS. 6A–6D. Thereafter, in step 701, a determination is made whether or not Blast mode has been enabled. If not, the process proceeds to step 705 to determine whether or not a prefetch has been requested. If not, the process returns to step 701. However, if in step 705 a prefetch has been requested, the process proceeds to step 706 to determine whether or not the line desired to be prefetched resides within L2 cache 203. If not, in step 708, the requested cache line is prefetched from memory 209 or from one of stream buffers 402, 405 or 406 into L1 cache 202 and L2 cache 203. Additionally, an exclusion tag (one or more bits) is reset within L1 cache directory 410. Directory 410 performs the typical functions of a cache directory. In this case, an entry in the directory field associated with the prefetched cache line is reset so that the exclusion tag bit indicates that the prefetched cache line resides in both L1 cache 202 and L2 cache 203. As will be discussed below, control logic within the L1 cache controller 411 is modified in accordance with the flow diagram of FIG. 8 to monitor this exclusion tag when de-allocating a cache line.

If the line to be prefetched does reside in L2 cache 203, the process proceeds to step 704 to prefetch that cache line from L2 cache 203 to L1 cache 202. The foregoing procedure described with respect to steps 700, 704, 705, 706, 707, and 708 essentially corresponds to steps 601–621 shown in FIGS. 6A–6D, in a summarized fashion. Steps 704 and 708 correspond to steps 607, 613, 618 and 619.

If in step 701, Blast mode has been enabled (see step 620), the process proceeds to step 702 to determine whether or not a prefetch within Blast mode has been enabled. If not, the process loops back to step 701. However, if a prefetch in Blast mode has been initiated, the process proceeds to step 703 to determine whether or not the line to be prefetched resides within L2 cache 203. If so, the process proceeds to step 704 to prefetch that line from L2 cache 203 into L1 cache 202. Additionally, the exclusion tag within L1 directory 410 is reset as described above with respect to step 708.

If the cache line does not reside within L2 cache 203, the process proceeds to step 707 to prefetch the cache line from memory 209 or from one of buffers 402, 405, 406 into L1 cache 202. Additionally, the aforementioned exclusion tag is set within L1 directory 410 indicating that the cache line prefetched from memory 209 or one of the stream buffers only resides within L1 cache 202 and not within L2 cache 203.

As noted by the flow diagram of FIG. 7, when Blast mode has not been enabled, "inclusion" is maintained, while in Blast mode "inclusion" is not maintained, wherein in step 707, prefetching occurs only into L1 cache 202.

Figure 8:
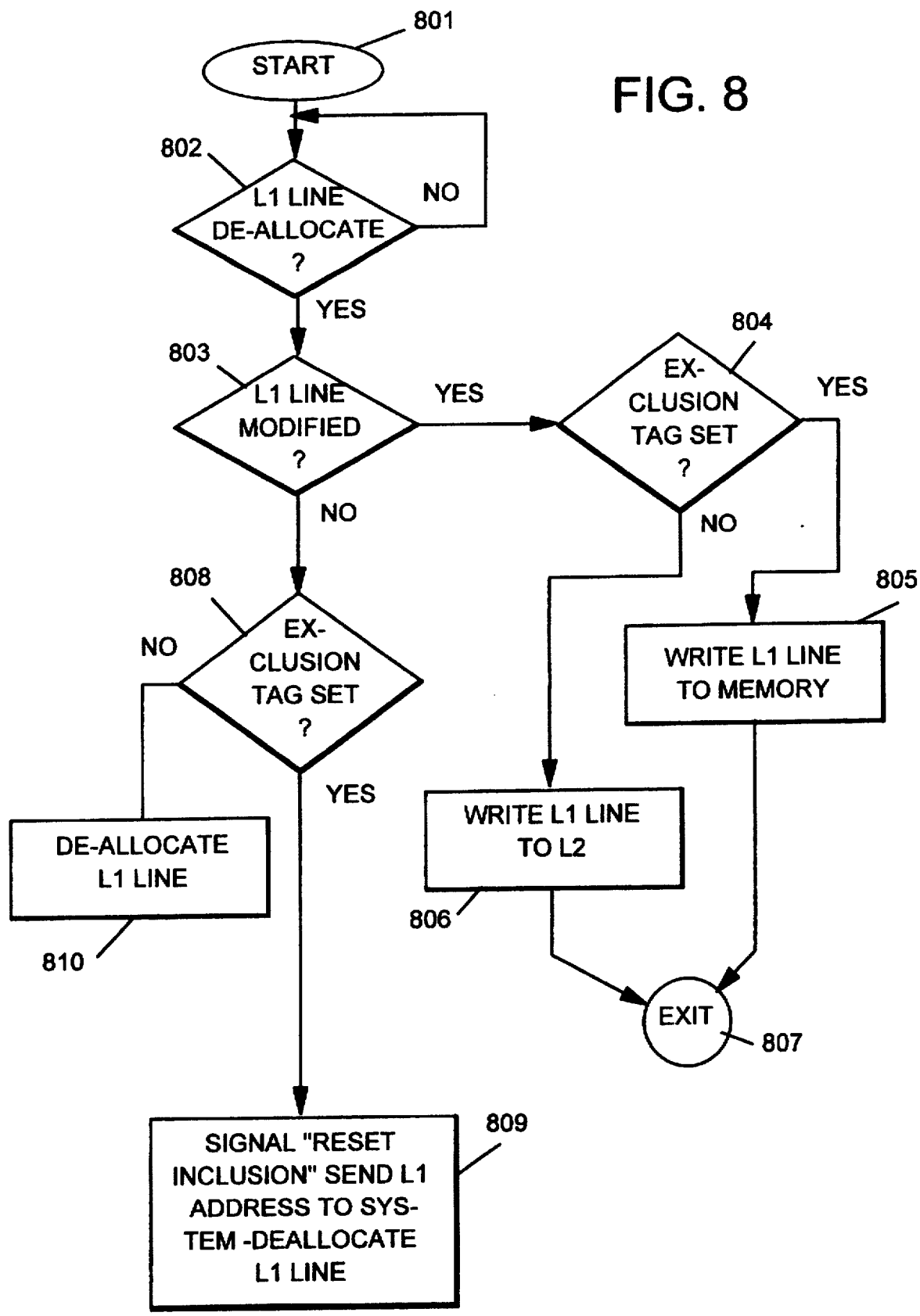
FIG. 8 illustrates de-allocation of the prefetched cache line prefetched in accordance with the flow diagram of FIG. 7.

Referring next to FIG. 8, there is illustrated a flow diagram of de-allocation of a cache line when "inclusion" is not maintained between L1 cache 202 and L2 cache 203 (when Blast mode is enabled). The process begins at step 801 and proceeds to step 802 wherein a determination is made whether or not the cache line is to be de-allocated. If not, the process just loops until the determination is made to de-allocate a particular cache line. The process proceeds to step 803 wherein a determination is made whether or not the cache line to be de-allocated has been modified. If not, in step 808, a determination is made whether or not the cache line to be de-allocated resides also within L2 cache 203. This determination may be made by controller 411 monitoring the exclusion tag within directory 410.

If the exclusion tag has been set with respect to this cache line indicating that the cache line does not also reside in L2 cache 203, the process proceeds to step 809 wherein system 200 is signalled with a "reset inclusion" signal and the address corresponding to the cache line to be allocated is sent by bus 204 throughout system 200 so that the cache line may be de-allocated.

If in step 808, a determination is made that the cache line does reside within L2 cache 203 (i.e., the exclusion tag was not set), the process proceeds to step 810 to de-allocate the cache line in the traditional manner when "inclusion" is followed.

If in step 803, it is determined that the cache line to be de-allocated by CPU 201 as been modified, the process proceeds to step 804 to determine whether or not the cache line resides within L2 cache 203. As described above, this may be accomplished by controller 411 determining if the exclusion tag in directory 410 has been set or not. If the exclusion tag has not been set, in step 806, the cache line is written from L1 cache 202 into L2 cache 203, which is responsible for data coherency within system 200. The process ends at step 807.

If the cache line in step 804 does not reside within L2 cache 203 (i.e., the exclusion tag has been set with respect to this cache line), the process proceeds to step 805 to write the cache line to memory 209.

As noted above, a filter replacement algorithm is implemented to govern the allocation of stream filter entries and stream address buffer entries (and the corresponding stream data buffer entries). In accordance with the description above with respect to FIGS. 6A–6D, a stream may be allocated (step 612) upon the occurrence of a filter hit (step 637). Upon the allocation of such a stream, a stream already existing within the stream address buffer will be thrashed (replaced). Additionally, a whole new set of stream entries will be prefetched into the various prefetch buffers.

In the description of FIGS. 6A–6D, there are several discussions as to the possibility that CPU 201 may request non-streamed data in between requests for streamed data existing within the prefetch buffers. The problem is that such a request may result in the allocation of a new stream within the stream address buffer, replacing an existing stream that is still being accessed by CPU 201. This is inefficient, since it is often likely that the existing stream is a "very good" stream being repeatedly accessed, and the newly allocated stream may end up not being accessed very often. Therefore, the goal of the present invention is to increase the performance of the processor by de-allocating a stream from the stream buffer only when it has not been recently accessed and a new stream has been detected.

The following discussion pertains to the table below. Relative time is indicated as beginning at time 0 and proceeding from left to right to time 17. Thus, each column corresponds to the relative time indicated at the top of the column. The cache miss sequence is an example sequence, which essentially corresponds to step 601 and 602, wherein there is an L1 cache miss on the indicated cache line. As noted above, the stream address buffer has a capacity for four streams; however, any number of streams may be implemented within the present invention. The stream filter has a capacity for ten entries; however, any number of entries may be implemented within the present invention.

An embodiment of the disclosed idea is to implement a stream buffer than can allocate up to 4 streams at any time. The filter buffer associated with the embodiment has 10 entries which are allocated on a least recently used basis.

In normal operation, when a stream access is detected by the filter, the filter entry for the stream is set to the most recently used position of the filter. Each time a new line is accessed in the associated Stream, the entry returns to the most recently used position. As an example, if there were 4 streams active (1,2,3,4), and if there were no other cache misses, the 4 streams would always occupy one of the 4 most recently used positions of the filter buffer. If there were cache misses between subsequent stream accesses, the filter would contain entries for those as well, so the 4 streams would occupy other than the 4 most recently used positions from time to time. With a filter of 10 entries, a stream could remain allocated in the filter as long as there were less than 10 instances of cache misses between two consecutive stream accesses. Clearly, if there were 10 cache misses between stream accesses, the LRU policy would age out the stream filter entry by allocating all 10 filter entries to the missed lines. If 4 streams were allocated, a stream filter entry would not age off the filter until there were 7 intervening cache misses (since the filter has enough entries for the 4 streams plus 6 other filter entries).

Refer to the table below. The state of the stream buffer and filter are shown progressing through a series of cache accesses. The example shows a series of cache miss lines. It should be understood that the lines that are in the Data Prefetch mode or Blast mode in the stream buffer, will be moved to the most recently used position of the filter when the speculatively loaded line is accessed for the first time (first hit).

could be several) remains in the stream filter until it is aged out. Similarly, at time 15, another X3 entry in the filter is made.

At relative time 17, stream X6 is allocated as, stream C is no longer in the filter when there is a filter hit for X6.

Using this mechanism allows the stream address buffers to hold four active streams in the presence of more than four data streams in the application. Without this mechanism, more than four active streams would continually cause new stream allocations, and data would be continually read into prefetch buffers only to be discarded. As a result, processor performance would be degraded.

An alternative implementation of this invention would be to provide a counter that would count a pre-determined number of cache line accesses between stream hits to determine that a stream should be deallocated rather than using filter entries for allocated streams. Such a counter

| Relative Time: | | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| Cache Miss Sequence: | | | | | | | | | | | | | | | | | | |
| | — | A | B | X1 | X2 | C | X3 | X4 | D | A | X5 | X6 | X7 | X5 | X2 | X3 | X2 | X6 |
| Stream Address Buffer: | | | | | | | | | | | | | | | | | | |
| 1 | A | A | A | A | A | A | A | A | A | A | A | A | A | A | A | A | A | A |
| 2 | B | B | B | B | B | B | B | B | B | B | B | B | B | X5 | X5 | X5 | X5 | X5 |
| 3 | C | C | C | C | C | C | C | C | C | C | C | C | C | C | C | C | C | X6 |
| 4 | D | D | D | D | D | D | D | D | D | D | D | D | D | D | D | D | D | D |
| Stream Filter: | | | | | | | | | | | | | | | | | | |
| 1 | N | A | B | X1 | X2 | C | X3 | X4 | D | A | X5 | X6 | X7 | X5 | X2 | X3 | X2 | X6 |
| 2 | N | N | A | B | X1 | X2 | C | X3 | X4 | D | A | X5 | X6 | X7 | X5 | X2 | X3 | X2 |
| 3 | C | N | N | A | B | X1 | X2 | C | X3 | X4 | D | A | X5 | X6 | X7 | X5 | X2 | X3 |
| 4 | N | C | N | N | A | B | X1 | X2 | C | X3 | X4 | D | A | A | X6 | X7 | X5 | X2 |
| 5 | B | N | C | N | N | A | B | X1 | X2 | C | X3 | X4 | D | D | A | X6 | X7 | X5 |
| 6 | D | B | N | C | N | N | A | B | X1 | X2 | C | X3 | X4 | X4 | D | A | X6 | X7 |
| 7 | N | D | D | N | C | N | N | A | B | X1 | X2 | C | X3 | X3 | X4 | D | A | A |
| 8 | A | N | N | D | N | N | N | N | A | B | X1 | X2 | C | C | X3 | X4 | D | D |
| 9 | N | N | N | N | D | D | N | N | N | N | B | X1 | X2 | X2 | C | X3 | X4 | X4 |
| 10 | N | N | N | N | N | N | D | N | N | N | N | B | X1 | X1 | X2 | C | X3 | X3 |

In the example, there are 4 streams active (A,B,C,D) at the start (relative time 0) and are contained in the stream address buffer. The last ten L1 misses are shown by the stream filter contents, with the most recent entry in position 1. The "N" entries in the stream filter denote misses which are not important in this discussion.

At relative time 1, there is another line load to L1 for stream A. The resulting stream filter content is shown in this column. Notice that as A is the most recent miss, the A entry moves to position 1, replacing the A entry at position 8. Alternatively, entry 8 could have been invalidated, but not removed from the filter.

The miss sequence is processed as shown, with X1, X2, denoting new streams which could trigger stream allocation. At relative time 7, with the X4 miss, the stream entry for D is removed from the filter. However, at this point stream D is still valid in the stream address buffer, so an access to this stream will still be detected and the stream will continue to be prefetched. In the example, shown, at time 8, stream D is accessed again, putting D back in the stream filter.

At relative time 13, a second miss for stream X5 occurs. At this point stream B is no longer in the stream filter, so X5 is assigned to stream address buffer 2. At time 14, a second miss for stream X2 occurs. Since the four streams active (A, X5, C, D) are contained in the stream filter, X2 is not allocated as a stream. In addition, the other X2 entry (there could be implemented in PCC 404 to count cache misses and hits for particular cache lines. Other mechanisms within the scope of the invention could be envisioned by one skilled in the art as well.

Although the present invention and its advantages have been described in detail, it should be understood that various changes, substitutions and alterations can be made herein without departing from the spirit and scope of the invention as defined by the appended claims.

What is claimed is:

1. An apparatus operable for prefetching data to a memory subsystem from a main memory, wherein said memory subsystem is associated with a processor coupled to said main memory, said apparatus comprising:

a stream buffer operable for containing X streams, wherein X is a positive integer; and means operable for de-allocating one of said X streams after a predetermined number of potential new streams are detected, wherein said predetermined number is greater than 1.

2. The apparatus as recited in claim 1, further comprising means operable for allocating a new stream in said stream buffer after said predetermined number, wherein said new stream replaces said one of said X streams, wherein X is a maximum number of streams within said stream buffer.

3. The apparatus as recited in claim 2, wherein said one of said X streams remains in said stream buffer until said new stream is allocated.

4. The apparatus as recited in claim 1, wherein said memory subsystem is a cache associated with said processor.

5. The apparatus as recited in claim 4 wherein said memory subsystem is a primary cache coupled to said processor.

6. The apparatus as recited in claim 5, wherein said primary cache is embedded on a chip with said processor.

7. The apparatus as recited in claim 1, wherein said de-allocating means further comprises a means for counting said predetermined number.

8. The apparatus as recited in claim 1, wherein said predetermined number is greater than or equal to a number of stream filter entries minus a number of stream buffer entries.

9. The apparatus as recited in claim 1, wherein a head of each of said X streams resides within a primary cache coupled to said processor.

10. An apparatus operable for prefetching data to a memory subsystem from a main memory, wherein said memory subsystem is associated with a processor coupled to said main memory, said apparatus comprising:

a stream buffer operable for containing X streams, wherein X is a positive integer; and means operable for de-allocating one of said X streams after a predetermined number of potential new streams are detected, wherein said de-allocating means further comprises a stream filter operable for containing Y entries, wherein Y is a positive integer, wherein said Y entries are allocated on a least recently used basis (LRU), wherein said Y entries correspond to memory subsystem misses, and wherein an entry is aged out of said stream filter after said predetermined number.

11. The apparatus as recited in claim 10, wherein two of said Y entries are identical.

12. The apparatus as recited in claim 10, wherein said predetermined number equals Y.

13. The apparatus as recited in claim 10, further comprising means operable for reallocating said one of said X streams when there is a memory subsystem access for said one of said X streams before a memory subsystem access for said new stream.

14. A system for prefetching data from a main memory to a cache associated with a processor coupled to said main memory by a bus, said system comprising:

a stream buffer for allocating X streams;

a stream filter having Y entries each representing a cache miss, wherein X and Y are positive integers, and wherein each of said X streams is represented by at least one of said Y entries; and means for maintaining a stream in said stream buffer until all of said at least one of said Y entries representing said stream have been deallocated from said stream filter.

15. The system as recited in claim 14, further comprising means for allocating a new stream in said stream buffer in response to a cache miss of data corresponding to said new stream after said all of said at least one of said Y entries representing said stream have been deallocated from said stream filter.

16. The system as recited in claim 15, wherein said stream remains in said stream buffer until said new stream is allocated in said stream buffer.

17. The system as recited in claim 14, further comprising means for reallocating said stream in said stream buffer after all of said at least one of said Y entries representing said stream have been deallocated from said stream filter when a cache miss occurs corresponding to said stream.

18. The system as recited in claim 14, wherein said Y entries are deallocated from said stream filter on an LRU basis.

19. The system as recited in claim 14, wherein a head of each said X streams resides on a processor-side of a bus coupling said processor to said main memory.

20. In a data processing system, a method for prefetching cache lines from a main memory to a cache coupled to a processor coupled by a bus to said main memory, wherein said prefetching is augmented with the utilization of a stream buffer and a stream filter, wherein said stream buffer includes an address buffer and a data buffer, wherein said stream buffer holds one or more active streams, and wherein said stream filter contains one or more entries corresponding to said one or more active streams, said method comprising the steps of:

monitoring a sequence of cache misses;

replacing entries in said stream filter in response to said cache misses on an LRU basis; and maintaining one of said one or more active streams in said stream buffer until all of said one or more entries corresponding to said one of said one or more active streams have been replaced by said replacing step.

21. The method as recited in claim 20, further comprising the step of allocating a new active stream in said stream buffer in response to a cache miss of data corresponding to said new active stream after said all of said one or more entries corresponding to said one of said one or more active streams have been replaced by said replacing step.

22. The method as recited in claim 21 further comprising the step of reallocating said one of said one or more active streams in said stream buffer after said all of said one or more entries corresponding to said one of said one or more active streams have been replaced by said replacing step when a cache miss occurs corresponding to said one of said one or more active streams.

23. The method as recited in claim 21, wherein said one of said one or more active streams remains in said stream buffer until said new active stream is allocated in said stream buffer.

24. The method as recited in claim 20, wherein a head of each of said one or more active streams resides on a processor-side of a bus coupling said processor to said main memory.

* * * * *

UNITED STATES PATENT AND TRADEMARK OFFICE
CERTIFICATE OF CORRECTION

PATENT NO. : 5,737,565
DATED : April 7, 1998
INVENTOR(S) : Michael J. Mayfield

It is certified that error appears in the above-indentified patent and that said Letters Patent is hereby corrected as shown below:

On the title page, item [54] and column 1, lines 1-3:

The title should read: --SYSTEM AND METHOD FOR DEALLOCATING STREAMS FROM A STREAM BUFFER--.

Signed and Sealed this

Twenty-seventh Day of October, 1998

Attest:

BRUCE LEHMAN

Attesting Officer

Commissioner of Patents and Trademarks